Figure 1:
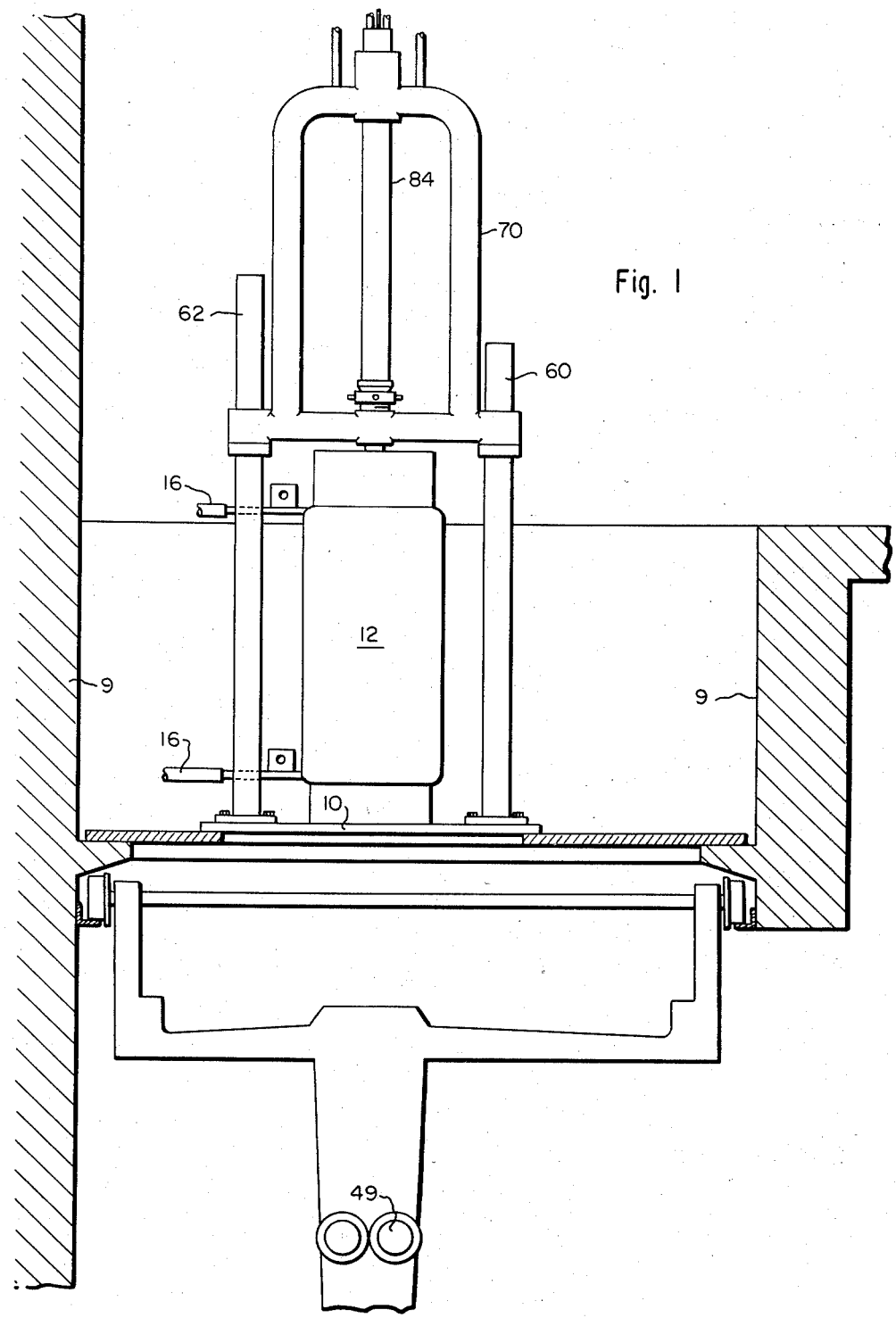

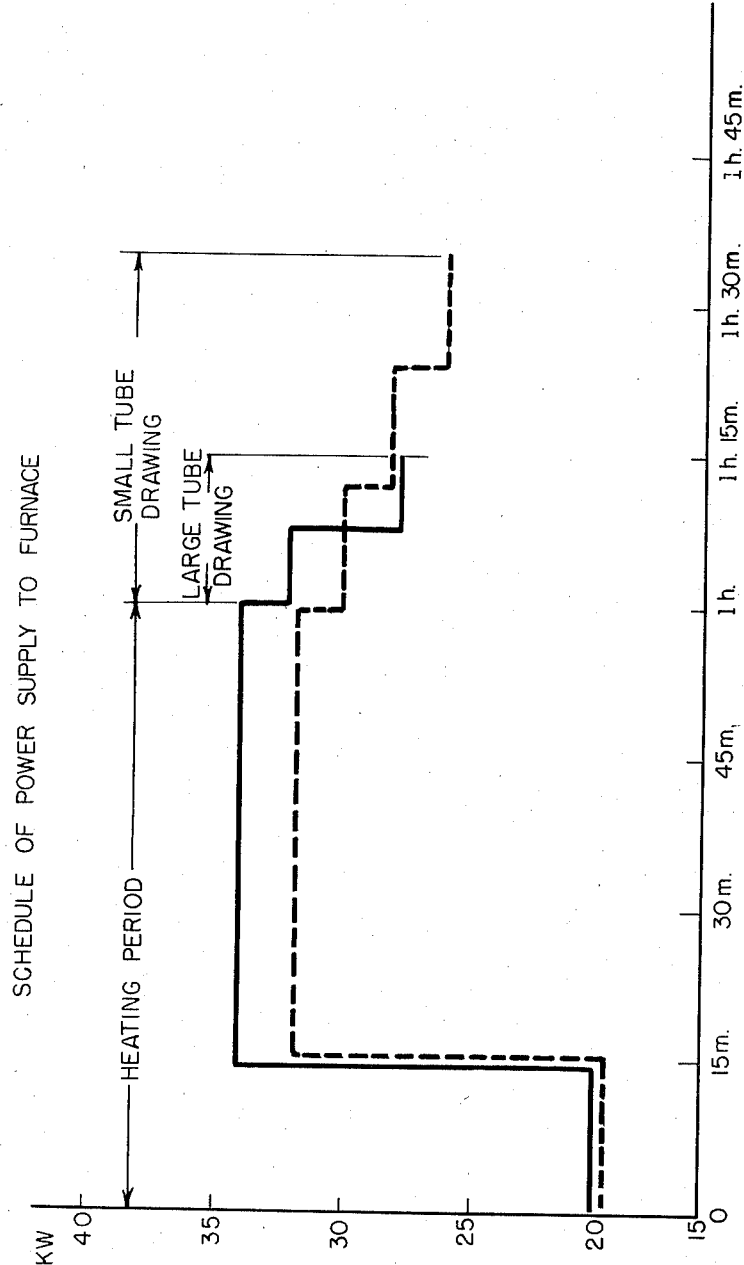

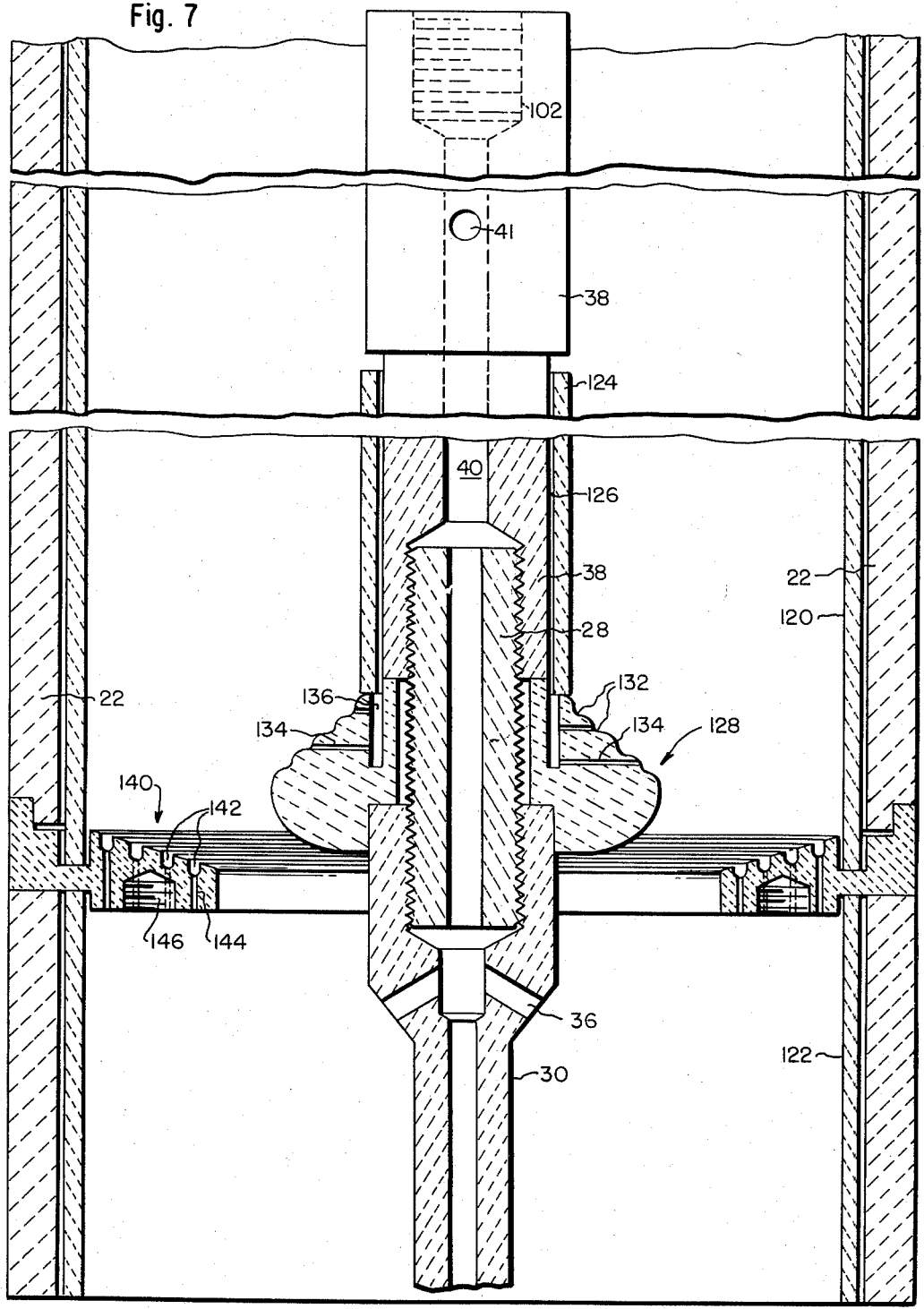

United States Patent Office 2,852,891
Patented Sept. 23, 1958

2,852,891

PROCESS AND APPARATUS FOR THE PRODUCTION OF DRAWN ARTICLES OF VITREOUS SILICA

Henri J. C. George, Paris, France, assignor to Quartz & Silice S. A., Paris, France, a corporation of France Application June 20, 1955, Serial No. 516,531

Claims priority, application France June 30, 1954

5 Claims. (Cl. 49—17.1)

This invention relates to the manufacture of vitreous silica articles and in particular to optically clear hollow shapes and tubing.

Although the desirability of vitreous silica tubing has long been recognized as of great importance in the manufacture of various kinds of optical instruments, thermometers and the like (because of its optical qualities and extremely high melting point), the production of satisfactory tubing has proved enormously difficult. The combination of the high melting point and the high viscosity of the material renders it an extremely delicate and costly task; moreover the presence of minute quantities of impurities causes serious discoloration, bubbles, and devitrification.

After years of experimentation a satisfactory process and apparatus have finally been developed. It is first necessary to reduce quartz crystals to powder form and remove all traces of impurities such as iron and carboniferous matter; the powder is then heated slowly and carefully until it melts and forms an ingot, preferably of cylindrical form with a center hole. It is from such an ingot, properly made, that satisfactory tubing may be drawn with the apparatus forming the subject matter of the present invention.

The most important object of the invention is to produce tubes or rods of vitreous silica which are free from bubbles, spots, striations, or discolorations.

Another object of the invention is to make possible the drawing of articles of vitreous silica having close dimensional tolerances.

A further object of the invention is to improve the economy and efficiency with which articles of vitreous silica can be manufactured.

An important feature of the invention resides in apparatus by means of which the extremely critical spatial relationship may be maintained between the customary die ring and die core.

Another feature of the invention resides in a mandrel suspended from the die core in position to receive the conical flow of silica as it passes down between the core die and the die ring. It has been found that for a desired tube diameter a mandrel of suitable length causes stabilization of the inner dimension of the tube at a constant point. The outside diameter of the tube is dependent primary upon the drawing speed, and by thus fixing accurately the inside dimension upon the mandrel, both dimensions are much easier to control, since otherwise a change in drawing speed would have a tendency to affect both inside and outside diameters.

Another feature of the invention resides in maintaining constant the viscosity of the silica within the furnace, a result obtained by rapidly bringing the furnace temperature to between 2000° and 2500° C. and then gradually reducing the power supplied to the furnace during the drawing operation, not only to prevent a further rise in the temperature of the silica ingot but also to compensate for the diminishing volume of the ingot as the drawing proceeds.

An extremely important advantage resulting from the practice of the invention is the fact that one can for the first time on a commercial scale produce transparent hollow articles drawn from vitreous silica which are characterized by complete absence of bubbles.

Figure 2:
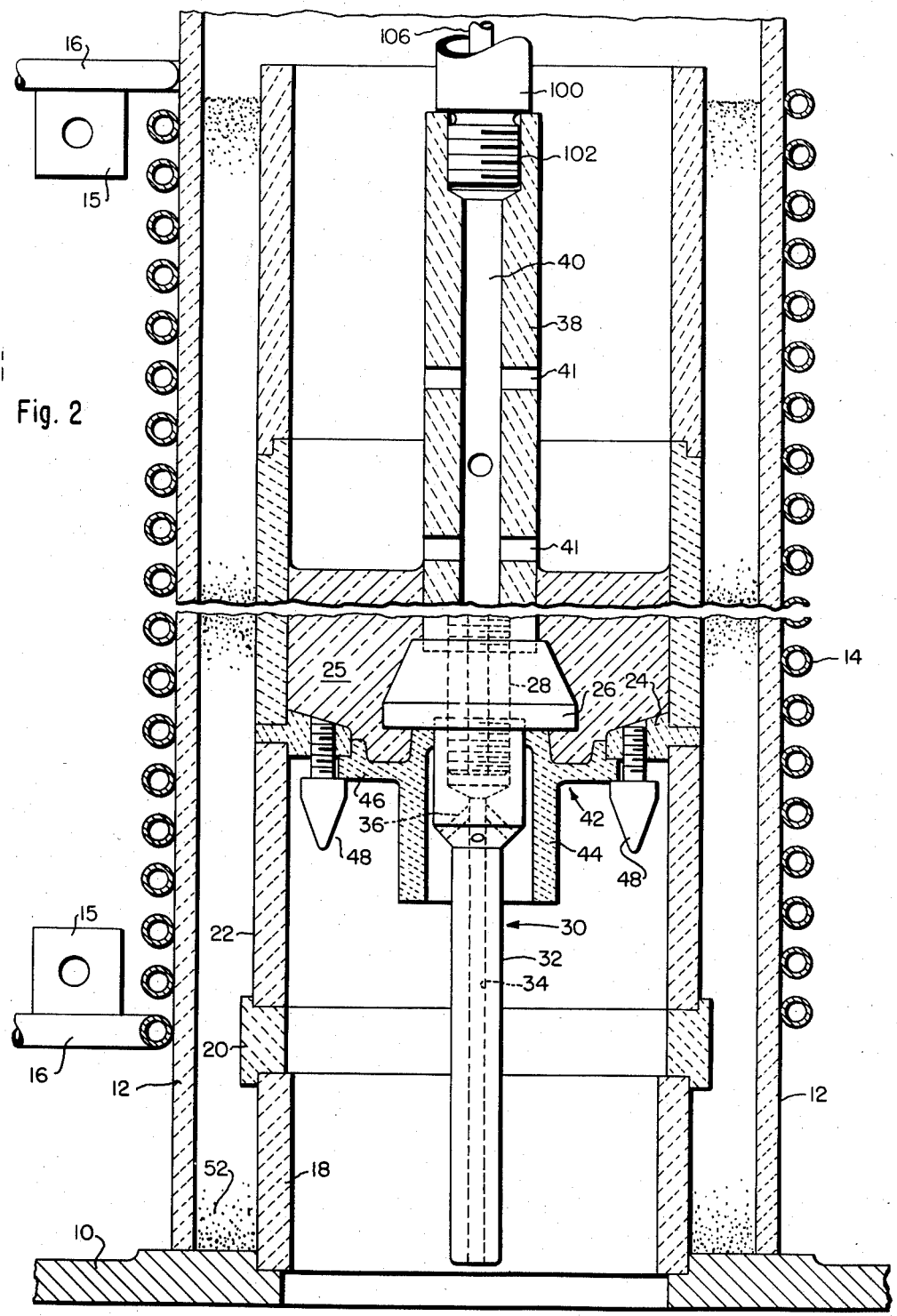
Figure 4:
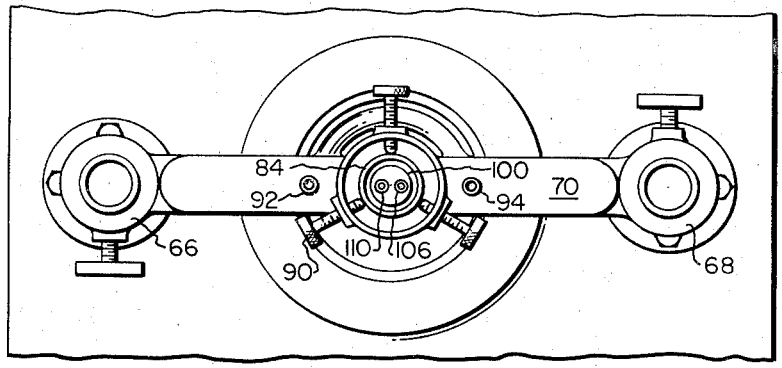
Figure 3:
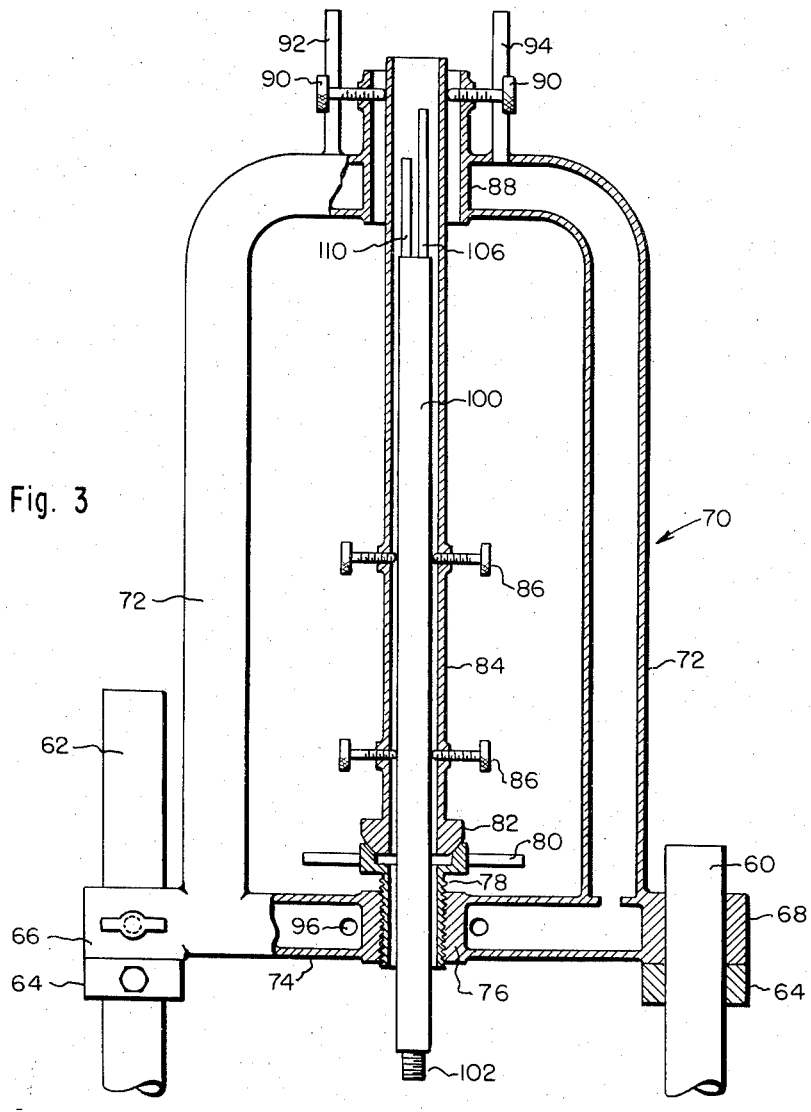
Figure 6:
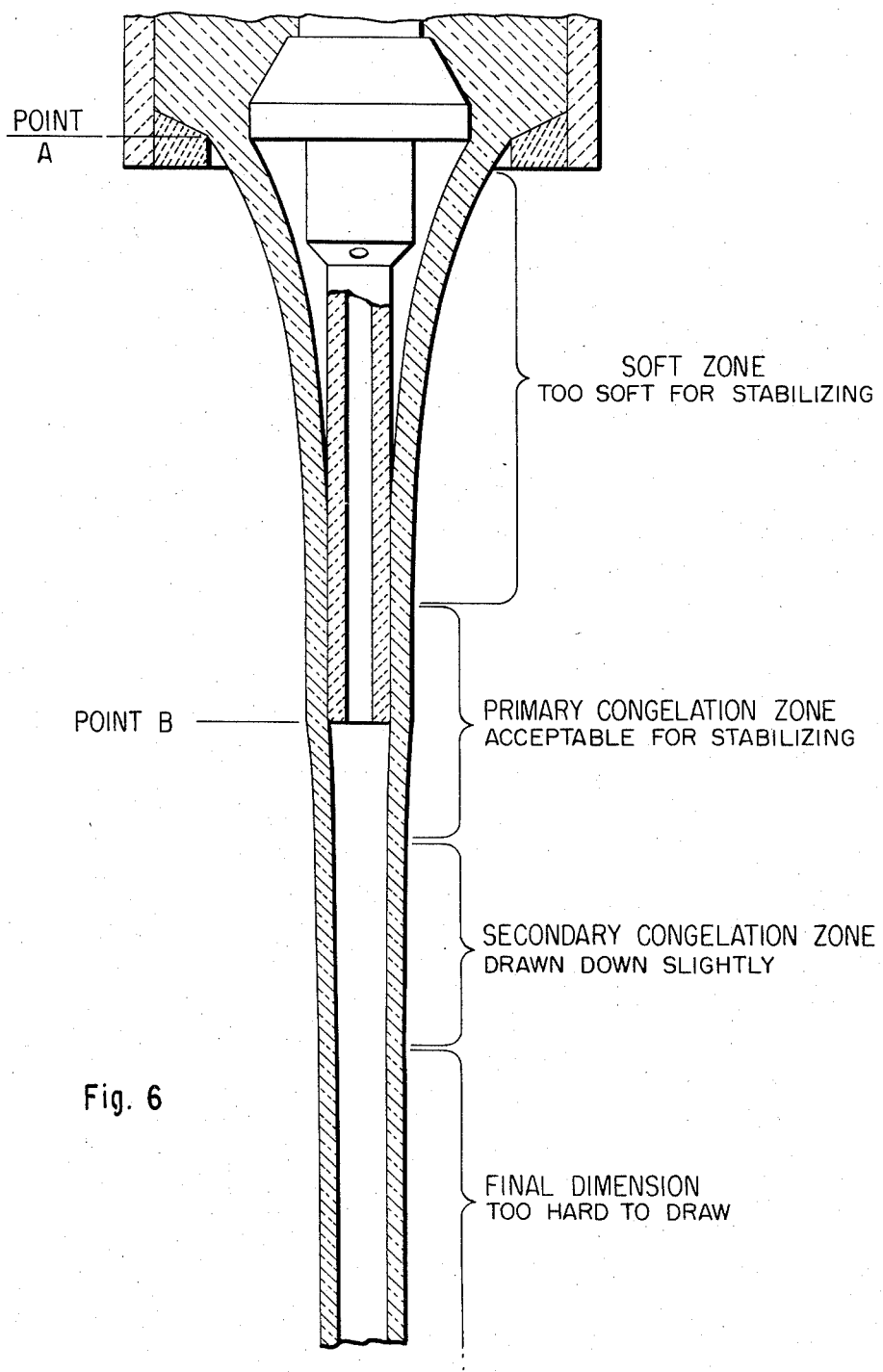

These and other objects and features of the invention will be more readily understood and appreciated from the following detailed description of a preferred embodiment selected for purposes of illustration and shown in the accompanying drawings, in which:

Fig. 1 is a view in vertical elevation of the drawing furnace,

Fig. 2 is a view in cross-section taken vertically through the interior of the furnace proper, Fig. 3 is a view in vertical cross-section through the apparatus used to suspend and adjust the die core and mandrel, Fig. 4 is a plan view, Fig. 5 is a diagram showing the power schedule for the drawing furnace, Fig. 6 is a diagrammatic illustrating the function of the mandrel, and Fig. 7 is a view in cross-section through an alternative form of die core and die ring.

By way of preface to the description of the details of the construction shown in the drawing it seems desirable to consider the elements of primary importance. As can best be seen in Fig. 2, an ingot 25 of pure transparent fused silica is placed within a crucible 22 of pure graphite, where it rests at its lower end upon a substantially frusto-conical die core 26. Spaced from the lower end of the die core is an annular die ring 24 also of pure polished graphite. From the bottom of the die core 26 there is suspended a hollow graphite mandrel 32. In Fig. 6 a plug 42 has been removed to permit the now melted silica to be drawn downwardly. In its course the silica encounters the mandrel and flows about it, there being drawing rolls 49 mounted some feet below the end of the mandrel to exert a steady downward pull.

In drawing tubing to close inside and outside dimensions, there are many factors which can be varied to affect the result, including:

(1) Viscosity (a function of temperature).
(2) Drawing rate (tension).
(3) Width of the opening of the die members.
(4) Shape of die members.
(5) Length and diameter of the mandrel.

One feature of the invention resides in securing a satisfactory measure of control of the dimensions of the tubing by maintaining the silica at constant viscosity during the drawing operation, a result achieved by employing an induction furnace for maximum uniformity of heat distribution and by progressively reducing the power supplied to the furnace during the drawing operation in order to limit the temperature of the silica as well as to compensate for the diminishing volume of the ingot. In Fig. 5 there are shown two illustrative curves of power supply plotted against time. These curves have been found satisfactory for operations on ingots weighing approximately 7 kilograms and about 200 mm. in height. For the first fifteen minutes power is supplied at the rate of 20 kilowatts, and the ingot is heated relatively slowly. During this initial period gases are driven off from the furnace and the furnace and ingot conditioned for intensive heating which follows immediately as the power supplied is raised to 34 kilowatts if large size tubing is to be drawn and to 32 kilowatts if small size tubing is to be drawn. At the end of the first hour the temperature of the ingot reaches about 2000° C., somewhat above the melting point of silica. The plug at the bottom of the furnace is then removed and the drawing operation commenced. If the power supply were to be maintained at the rate of 34 kilowatts, the silica would vaporize and react with the graphite of the crucible to form carbon monoxide which tends to form bubbles in the finished product. Here the importance of the ingot form is to be emphasized, since the formation of bubbles is minimized in a solid, bubble-free ingot as contrasted to a crucible charge of powder of granular form. It is also to be noted that vaporized silica condenses to form a brownish powder, the presence of which adversely affects the quality of the tubing. At the moment the drawing is started, the power is reduced. It should be noted that it requires more time to draw an ingot into small tubing than into tubing of relatively large diameter. That is why the temperature is raised to a higher point for the larger tubing, since the melted silica must in that case flow out of the furnace more rapidly than is required when relatively small tubing is being drawn. The precise drawing time of course varies inversely as the cross-sectional area of silica in the drawn tube, and the curves of Fig. 5 are illustrative only. As shown, when a large tube is being drawn, the drawing operation may require but fifteen minutes and the power may be reduced at the start of the drawing operation from 34 to 32 kilowatts and then from 32 to 28 kilowatts after seven or eight minutes. The broken line curve represents operations for the production of relatively small tubing wherein the drawing operation requires perhaps thirty-five minutes. At the start of the drawing, the power supply is reduced from 32 to 30 kilowatts. After about twelve minutes there is a further reduction to 28 kilowatts and a third reduction after twenty-four minutes to about 26 kilowatts.

The drawing furnace is best shown in Fig. 2, wherein it appears that the furnace is mounted on a base 10 supported, as shown in Fig. 1, on a steady foundation 9 of relatively massive vibration proof construction. The base of the furnace may conveniently be located at the second floor level of a building, in order to provide space beneath the furnace for a pair of drawing rolls 49 as well as for a suitable receptacle disposed beneath the drawing rolls for receiving lengths of tubing cut off at convenient intervals from the drawn tubing after it passes through the drawing rolls.

The furnace is of vertical cylindrical form and organized about a cylindrical tube 12 of silica or other suitable refractory material around the periphery of which is disposed a hollow copper coil 14 having end terminals 15 conveniently disposed at the side of the furnace and further provided with inlet and outlet conduits 16 through which water may be circulated in order to cool the coil. Resting on the base 10 within the silica tube 12 is a short ring 18 of silicon carbide on which is mounted a ring 20 of pure graphite forming the base of a hollow heating tube 22 also of pure graphite and conveniently formed by a series of superposed annuli fitted together. Disposed between adjacent graphite annuli is a graphite die ring 24 which has the form of an annular internal flange having a downwardly sloping upper surface leading smoothly into a circular central opening. Cooperating with the die ring 24 is a die core 26, also of pure graphite, of generally frusto-conical shape and accurately positioned to be precisely concentric with the die ring 24. The die ring 24 and the die core 26 together form an annular opening or passage. It will be understood that the dimensions of the die core and die ring vary in accordance with the desired dimensions of the finished product. The die core 26 has a vertical central bore into which is threaded a hollow graphite bolt 28 extending both above and below the die core 26. Screwed onto the lower projection of the bolt 28 is a mandrel 30 having an elongated downwardly projecting stem portion 32 provided with a central bore or passage 34 communicating with the hollow passage through the bolt 28 and also with four upwardly inclined ports 36 disposed in an enlarged head portion formed at the upper end of the mandrel 30.

The upwardly projecting end of the hollow graphite bolt 28 is threaded into a socket formed in the lower end of a graphite rod 38 having a central longitudinal bore 40 communicating with at least two sets of lateral ports 41. The function of the rod 38 is to suspend the die core 26 and mandrel 30 precisely in the axis of the heating tube 22 and die ring 24. Any deviation from concentricity of these elements produces serious departures from uniformity of the drawn tubing.

During the heating period prior to the drawing operation, it is desirable that the bottom of the furnace be closed, a function performed by a plug 42 having a hollow central tubular portion 44 and an external horizontal flange 46 spanning the space between the die core and the die ring. The plug 42 is held in position by means of a number of graphite bolts 48 provided with enlarged heads which bear on the bottom of the flange 46 and which are screwed into sockets threaded into the die ring 24.

The annular space lying between the heating tube 22 and the silica shell 12 is filled with thermal insulating material such, for example, as pure carbon black.

In order to provide accurate means for centering the die core 26 and mandrel 30, I provide the apparatus shown in Figs. 3 and 4 and including a short cylindrical standard 60 mounted on the base 10 at one side of the furnace and a longer vertical standard 62 on the other side of the furnace. Each of the standards is provided with an adjustable stop or collar 64 and the standards may receive a pair of collars 66 and 68 projecting outwardly from water-cooled tubular frame 70 comprising a pair of opposed upright members 72 welded to a horizontal tube 74. At the center of the tube 74 there is disposed a threaded tubular portion 76 cooperating with a threaded bushing 78 operated by a pair of handles 80, by means of which the bushing 78 may be adjusted vertically. The upper end of the bushing 78 is formed as a round socket cooperating with a spherical body 82 secured to the end of a hollow vertical tube 84. The tube 84 is provided with at least two sets of set screws 86 which bear upon an internal tube 100. At its upper end the tube 84 passes through a tube 88 of larger diameter integrally formed with the water-cooled frame members 72 and provided with three set screws 90 which bear upon the surface of the tube 84. The frame members 72 are provided with water inlet and outlet conduits 92 and 94, there being a horizontal bridge conduit 96 spanning the tube 76 and providing a continuous coolant circuit so that coolant water entering the inlet 92 passes downwardly through the left-hand frame member 72, laterally through the horizontal tube 74, through the bridge conduit 96, through the right-hand portion of the tube 74 and then upwardly through the right-hand tube 72 to the outlet conduit 94. The lower end of the internal tube 100 is closed by a threaded plug 102 which screws into the upper end of the rod 38 (Fig. 2). There is also provided an outlet conduit 110 which extends to the bottom of the tube 100, thus providing means for circulating coolant liquid through the tube 100.

It will be observed that during the drawing operation air rises by convection through the tube being drawn, the hollow mandrel, the die core, the supporting rod, and out through the lateral ports in the upper portion of the rod. Moreover, the ports 36 in the head of the mandrel vent the space enclosed between the upper portion of the mandrel and the descending core of molten silica. It is also feasible to circulate nitrogen or other inert gas under pressure through the tubing, mandrel and support to carry off the fumes, although air is satisfactory, since it burns any reduction products which may form in the tube or crucible.

In operating the furnace, the plug 42 is first bolted to the die ring 24. Then the tube 38 bearing the die core 26 and the mandrel 30 is inserted from above into the furnace, the bottom of the die core 26 being temporarily supported by the plug 42. The next step is to insert in the furnace the silica ingot 25, the latter slipping over the rod 38 and coming to rest on the upper end of the die core 26. While this is being done, the frame 70 has been elevated until the collar 68 clears the standard 60, the frame then being rotated about the standard 62 in order to afford access to the furnace. The frame is then rotated until the collar 68 can be dropped over the standard 60. The tube 100 has been elevated by means of the handles 80 which are now used to lower the tube 100 so that the threaded plug 102 can be screwed into the socket in the upper end of the rod 38. The set screws 90 provide a relatively coarse adjustment by means of which the rods 100 and 38 may be brought into concentricity with respect to the die ring 24, and the set screws 86 provide a finer adjustment for securing exact concentricity.

It should be noted that the plug 42 not only serves to close the bottom of the furnace during the heating operation but is also very carefully dimensioned to cooperate with the mandrel, die core and die ring in order to provide at that critical point exact centering of the die core as well as determining the exact height of the die core with respect to the die ring. The adjustments carried by the frame 70 are used to prevent any inclination of the rod 38 from the axis of the furnace and thus cooperate with the plug 42 to insure accurate alignment and positioning of the internal and external die members.

When the ingot 25 has been melted, the operator reaches up from beneath the furnace with a pair of tongs and removes the bolts 48, thus permitting removal of the plug 42. The viscosity of melted silica is so great that the flow due to gravity is negligible; consequently the operator now reaches up from beneath and grasps the molten silica with tongs at a number of points in succession around the head of the mandrel 30, each time pulling downwardly. When he has thus succeeded in drawing down a succession of tongues of silica to a point below the end of the mandrel 30, he is then able to exert a continuous downward pull as the result of which the molten silica assumes tubular form above the initial glob. The operator continues to pull downwardly on the end of the silica until he is able to catch the drawn tube between the drawing rolls positioned beneath the furnace. Thereafter the drawing rate is accurately and precisely controlled by the speed of the drawing rolls, therebeing provided a variable drive for these rolls.

In Fig. 7 I have shown an alternative arrangement for the interior of the furnace, which offers some advantages. To begin with, I provide a graphite sleeve or liner for the inner wall of the heating tube 22, there being an upper sleeve 120 mounted above the die members and a similar member 122 disposed beneath them. The sleeves 120 and 122 are made of pure graphite machined to a wall thickness significantly less than that of the main furnace tube 22.

Similarly, the die core support rod 38 is encased by a thin-walled graphite tube 124 fitting rather loosely over the rod to provide an annular air space or passage 126 leading to the upper end of the furnace, the tube 124 being long enough to extend above the upper surface of an ingot.

As an ingot is melted during the drawing operation there is always some reaction between the graphite of the furnace wall and the molten silica, the result of which is to deposit impurities on the graphite surfaces. Consequently the useful life of the graphite members is relatively short. By providing the cheap protecting liners herein described, I am enabled greatly to prolong the life of the relatively expensive heating tubes and die core suspension rods, as well as to avoid contaminating the molten silica with impurities accumulated from previous draws, it being a simple matter to provide new liners for each draw.

The apparatus shown in Fig. 7 is also characterized by improvements in the die core and die ring. The die core 128 is of generally frusto-conical form, as before, but is here provided with a smoothly curved bottom and with a series of annular grooves or channels 132 each of which in turn is ported laterally as shown at 134 to communicate with an internal chamber 136 of annular configuration opening at its upper end into the passage 126 between the die core support rod 38 and the sleeve 124.

The die ring 140 is also provided with a series of annular grooves 142 cut into its upper surface, and each groove is bored vertically at intervals to provide a series of vent ports 144. (Tapped holes 146 are provided in the lower surface of the die ring to receive the bolts holding the plug.)

The channels and ports of the die core and die ring perform two important functions. In the first place the channels reduce the die surface area coming in contact with the molten silica and thus render the drawing easier and smoother, minimizing any tendency toward devitrification, deformation, or scratching of the surface of the finished article. Moreover the vents in the die members provide exhaust passages through which hot vapors of silica or impurities may leave the furnace without becoming entrapped in the silica. The presence of such gaseous impurities in the finished article is revealed by the presence of very small bubbles which can render useless some or all of the material drawn.

The function of the mandrel is not so much to form the tubing but rather to stabilize the final dimensions thereof. The factors involved in determining the length of the mandrel are illustrated in Fig. 6 wherein it will be seen that as the silica leaves the die core and die ring, it is comparatively soft and easily deformed. In its downward travel it is of course undergoing cooling and soon reaches a condition in which the molten silica begins to congeal, becoming harder and more resistant to deforming stresses. Ultimately it reaches a completely hard condition in which the viscosity is for practical purposes infinite and the tubing cannot be deformed. Intermediate the relatively soft molten condition and the hard stiff condition there is an intermediate state, to which I have applied the term "congelation." It is therefore evident that the silica passes first through a zone in which it is soft, then through a zone during which congelation takes place, and then into a hard zone wherein the tubing has become fixed to its final dimensions. It is essential, in accordance with the invention, that the mandrel terminate at its lower end within the zone of congelation.

These considerations would lead to the concept that the end of the mandrel should terminate just before the silica reaches the hard zone and that the mandrel should have the same diameter as that of the finished tubing. I have discovered, however, that optimum results are achieved if the mandrel is made slightly larger than the final inside diameter of the tubing and disposed a significant distance above the hard zone, extending from point A to point B. For ease of understanding I have therefore divided the congelation zone into a "primary zone" and a "secondary zone," the primary congelation zone lying above the secondary congelation zone; the mandrel is made slightly larger in diameter than the inside diameter of the finished tubing, and the secondary congelation zone is employed to produce a slight further drawing and contraction of the tubing. If the mandrel does not extend into the primary congelation zone, it will be found that the finished product has undesirable departures from dimensional specifications; the internal and external peripheries may not be concentric, and there are occasional warps or bends in the finished tubing. On the other hand, if the mandrel extends into the secondary congelation zone, the tubing will not flow smoothly off the mandrel but will bind; furthermore, there will not then be sufficient time (or length) within which to draw the tubing to the final desired internal diameter.

A mandrel of proper length exhibits an important characteristic, in that there is emitted at the tip of the mandrel a harsh grating sound. Since the optimum mandrel length will vary with the dimensions and wall thickness of the tubing being produced, as well as with the viscosity and drawing rate, some experimentation may be required for the determination of the optimum length under specific conditions. I have obtained satisfactory results with mandrel lengths ranging from 160 mm. to 260 mm. For example, the following combinations of dimensions have given satisfactory results:

| | | | |
|---|---|---|---|
| Tube I. D. mm. | 14 | 20 | 75 |
| Tube O. D. mm. | 16 | 23 | 80 |
| Mandrel Length mm. | 240 | 240 | 170 |
| Mandrel O. D. mm. | 14.5 | 20.5 | 75.7 |
| Die Ring I. D. mm. | 90 | 110 | 120 |
| Die Core O. D. mm. | 67 | 85 | 83 |

The location of the primary congelation zone obviously depends upon the volume of silica leaving the die orifice in a given unit of time, and that is in turn dependent upon the dimensions of the die core and die ring. It also depends upon the rate of travel of the silica along the mandrel. Consequently the recited dimensions are illustrative rather than definitive.

Inasmuch as the mandrel is hollow and affords a passage for air to travel up the drawn tube, through the mandrel and its support and out at the top of the furnace, it must be borne in mind that the hollow mandrel itself exerts an effect upon the cooling rate of the fused silica, and it well may be that a mandrel of correct length stabilizes the location of the zone of primary congelation.

Inasmuch as the mandrel is larger in diameter than the internal diameter of the tube being produced, it follows that the mandrel does not serve the conventional function of a mandrel, such for example as are employed in the art of glass making, where the glass has no definite shape prior to reaching the mandrel. In the apparatus of the invention, the mandrel serves first to support the flowing silica against deformation while it is still soft, to stablize the fused silica dimensionally at a partly congealed state, and also to fix the distance in which the final drawing of the tube takes place, the edge of the extremity of the mandrel serving as a support or fulcrum supporting the silica against the thrust exerted by the drawing rolls.

The mandrel serves still another important function. There is a definite temperature gradient along the mandrel, which plays an important part in controlling the congelation rate of the drawn silica, thus further facilitating the stabilization of the dimensions of the tubing.

Those skilled in the art will readily understand that the "zones" to which I have referred are by no means sharply defined or compartmented but rather merge smoothly into each other, inasmuch as the cooling and stiffening of the silica is a continuous process. The concept of the zones is believed to be useful as a means of explaining and defining that aspect of the present invention which is based on the discovery that a mandrel placed at a correct distance below the orifice of the dies will exert a stabilizing effect upon the dimensions of the finished tubing. When tubing is drawn without a mandrel of the character herein described, it will be found that the specified dimensions cannot be held to tolerances greater than plus or minus 6%, whereas tubing drawn over a mandrel of the sort herein disclosed can easily be held within plus or minus 2% of specified dimensions, an improvement of great commercial value.

While the dies and mandrel herein shown and described are useful for manufacturing cylindrical tubing, it is to be understood that by a proper combination of die and mandrel forms it is also entirely practical to produce articles having different shapes, such as tubing of square, oval, or rectangular cross-section and tubing having a plurality of passages housed in a single envelope.

The present invention relates exclusively to pure vitreous silica, as opposed to glasses containing relatively large admixtures of such elements as lead, boron, and the like. However, the term "pure" does not exclude the presence of elements or compounds deliberately added in minute quantities to achieve special results and may therefore be said to refer to articles which are 99% pure silica, or more.

Having now disclosed my invention what I claim as new and desire to secure by Letters Patent of the United States is:

1. Apparatus for drawing siliceous materials, comprising a vertical crucible, and a die core and die ring mounted in juxtaposition adjacent the bottom of the crucible, the upper surfaces of said die core and die ring having a series of spaced grooves therein, said grooves being vented to the atmosphere.

2. Apparatus for drawing siliceous materials, comprising a vertical crucible, and a die ring and hollow die core mounted in juxtaposition adjacent the bottom of the crucible, the upper surfaces of said die core and die ring having a series of spaced grooves therein, said die core also being provided with exhaust ports leading from said grooves, and means venting said ports to the atmosphere.

3. Apparatus for drawing siliceous materials, comprising a vertical furnace, a crucible mounted within said furnace, a die core, means for supporting said core within said furnace and having a passage vented to the atmosphere, a die ring mounted adjacent the bottom of the furnace, the upper surfaces of said die core and die ring having a series of spaced grooves therein, said die core having lateral exhaust ports leading to an internal chamber formed in the die core, and said die ring having exhaust ports leading from the upper to the lower surface thereof.

4. The process of making hollow shapes of vitreous silica comprising heating a mass of substantially pure silica to a molten state, drawing the molten silica between members defining a tubular shape of fixed size, passing the molten silica toward and along a mandrel of lesser size whereon the silica is permitted partially to cool and form a shape determined by the members and mandrel, passing the partially cooled silica through a primary zone of congelation wherein the shaped silica is permitted to further cool and partially congeal, a portion of the primary zone being adjacent the far end of the mandrel, passing the shaped silica through a secondary zone of congelation which secondary zone is beyond the mandrel wherein the shaped silica is permitted to further cool and congeal, and subjecting the shaped silica to elongation and lateral contraction in said secondary zone until the shaped silica is wholly congealed.

5. The process of making hollow shapes of vitreous silica comprising heating a mass of substantially pure silica to a molten state, drawing the molten silica between members defining a tubular shape of fixed size, passing the molten silica first toward and then along a mandrel of lesser size whereon the silica is permitted partially to cool and form a shape determined by the members and mandrel, passing the partially cooled silica through a primary zone of congelation wherein the shaped silica is permitted to further cool and partially congeal, a portion of the primary zone being adjacent the far end of the mandrel, passing the shaped silica through a secondary zone of congelation which secondary zone is beyond the mandrel wherein the shaped silica is permitted to further cool and congeal, and subjecting the shaped silica to elongation and lateral contraction in said secondary zone until the shaped silica is wholly congealed.

(References on following page)

References Cited in the file of this patent

UNITED STATES PATENTS

| | | |
|---|---|---|
| 1,601,523 | George | Sept. 28, 1926 |
| 1,894,853 | Delpech | Jan. 17, 1933 |
| 2,155,131 | Hanlein | Apr. 18, 1939 |
| 2,396,254 | Everett | Mar. 12, 1946 |
| 2,433,116 | Greenbowe | Dec. 23, 1947 |

FOREIGN PATENTS

| | | |
|---|---|---|
| 750,425 | France | May 29, 1933 |